July 5, 1960
C W. MUSSER
2,943,513
DUAL STRAIN WAVE GEARING
Original Filed March 21, 1955
3 Sheets-Sheet 1
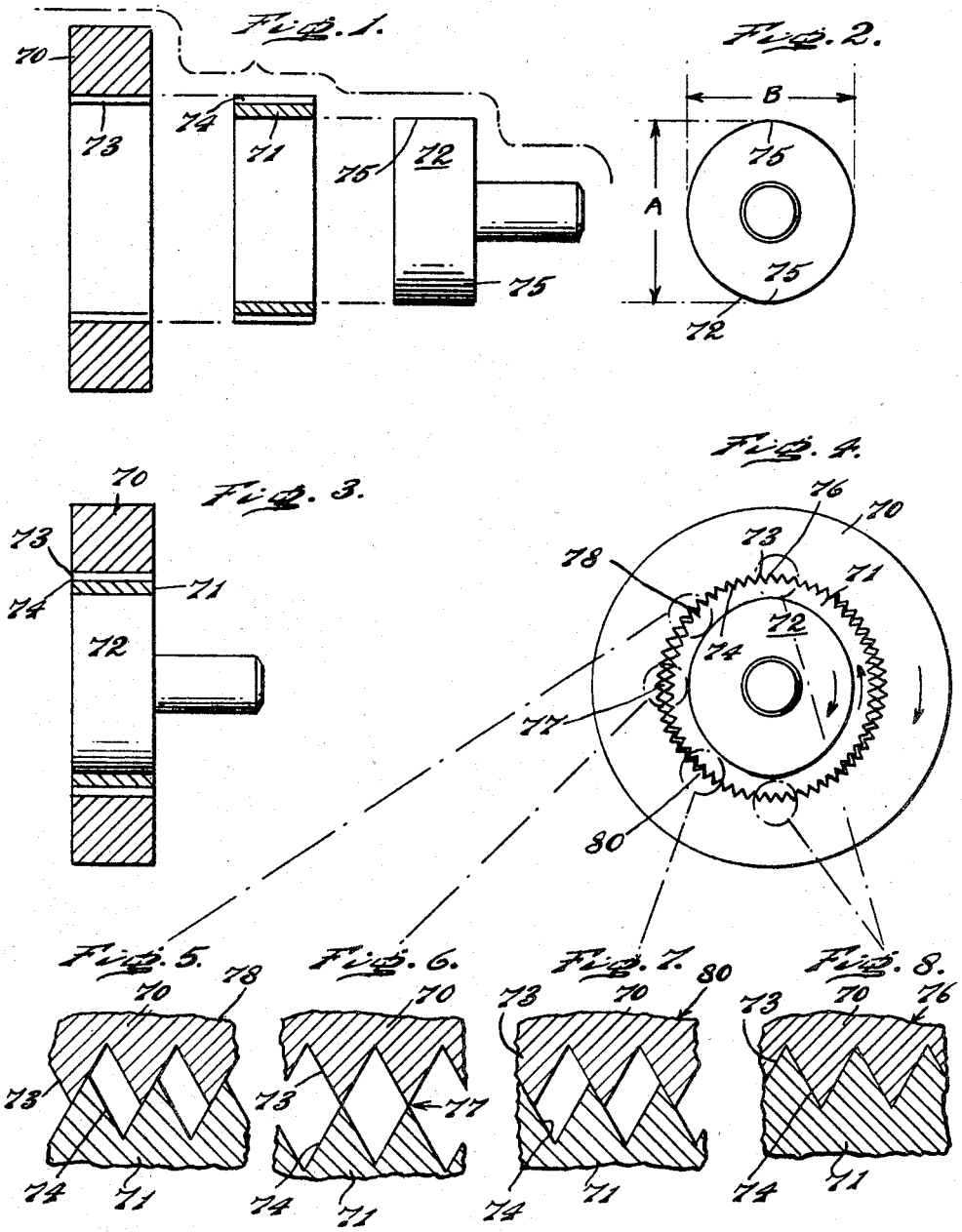
INVENTOR.
C. Walton Musser
ATTORNEYS.

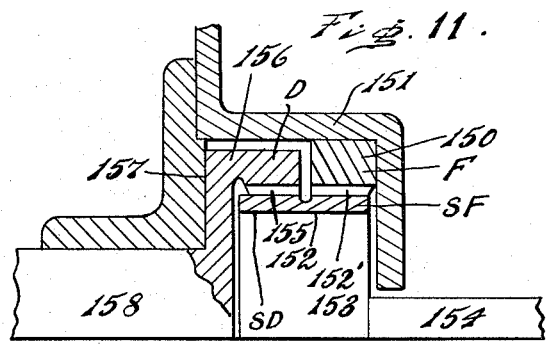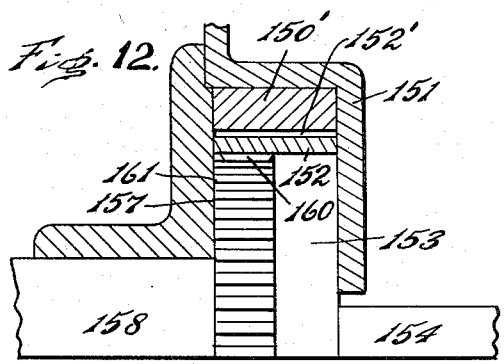

United States Patent Office 2,943,513
Patented July 5, 1960

2,943,513
DUAL STRAIN WAVE GEARING

C Walton Musser, Beverly, Mass., assignor to United Shoe Machinery Corporation, Boston, Mass., a corporation of New Jersey Original application Mar. 21, 1955, Ser. No. 495,479, now Patent No. 2,906,143, dated Sept. 29, 1959. Divided and this application May 2, 1957, Ser. No. 656,572

18 Claims. (Cl. 74—640)

The present invention relates to motion transmitting mechanism, and particularly to gearing in which relative motion occurs between an internal gear and a cooperating external gear.

The present application relates to dual strain wave gearing, a nonelected species of my application Serial No. 495,479, filed March 21, 1955, for Strain Wave Gearing, now U.S. Patent No. 2,906,143, granted September 29, 1959. The reader is referred to this patent for an understanding of the background and the basic principles which are involved in the present invention.

A purpose of the invention is to produce a very compact, convenient and inexpensive form of strain wave gearing by employing a strain gear which functions as a common element in cooperation with a plurality of different ring gears and is deflected to propagate a strain wave with respect to the plurality of different ring gears.

A further purpose is to secure a wide variety of available gear reductions by variations in gearing of the same design, and especially to obtain very large gear reductions.

A further purpose is to obtain gear ratios in the range between 10 to 1 and 1 million to 1 from a gearing system.

A further purpose is to obtain a very wide and preferably unlimited ratio selection.

A further purpose is to construct a motion transmitting device having a first ring, a second ring, and a third ring of different diameter from the first and second ring, concentric therewith and having a deflectable wall, and having a strain inducing element in engagement with the third ring and maintaining the third ring deflected into mating relation with the first and second ring at a plurality of circumferentially spaced positions interspaced by a nonmating position, and having means for moving the strain inducing element relative to the periphery of the third ring and thereby propagating a strain wave around the periphery of the third ring and causing relative rotation of the second ring with respect to the first ring.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

Figure 1 is an exploded axial section of a device for transmitting motion according to the present invention, in a simplified form.

Figure 2 is a right end elevation of the strain inducer shown in Figure 1.

Figure 3 is an axial section corresponding generally to the exploded section of Figure 1, but showing the parts assembled in their normal operating relationship.

Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figure 9:
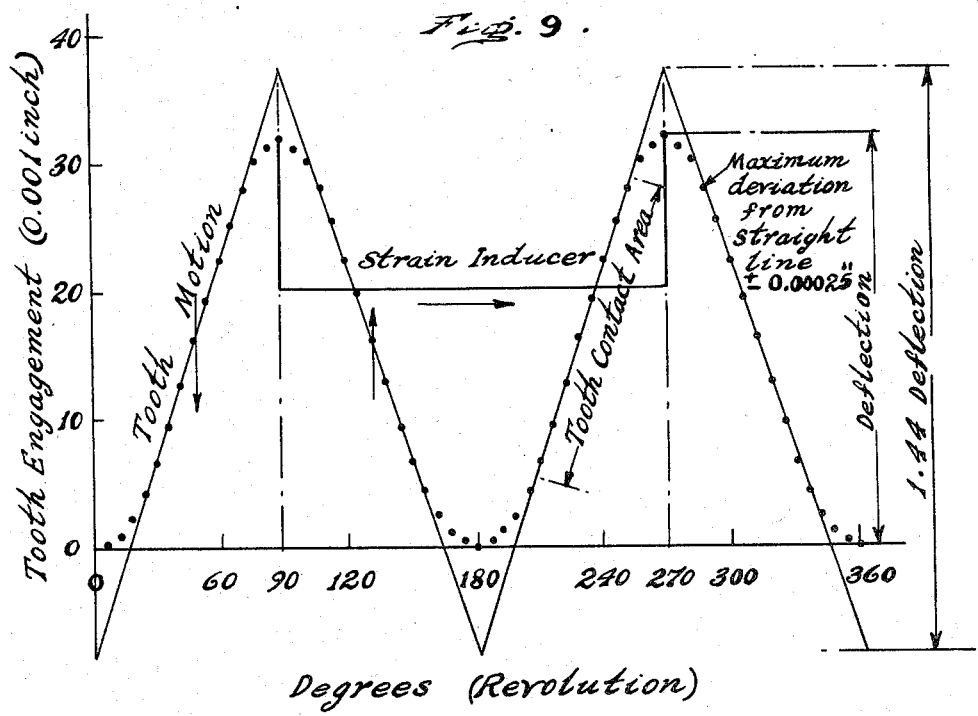

Figure 9 is a diagram showing strain wave as ordinate with respect to a developed deflection circle as the abscissa.

Figures 10A, 10B:
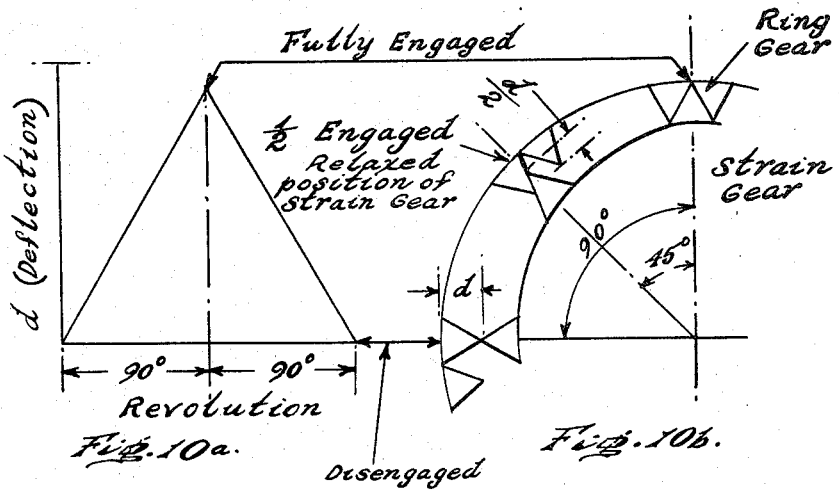

Figures 10a and 10b are diagrams which illustrate the shape of the tooth for a linear relation between deflection and revolution.

Figures 11 and 12 are fragmentary axial sections of various arrangements of the components in dual strain wave gearing according to the invention.

Describing in illustration, but not in limitation and referring to the drawings:

GENERAL FEATURES OF INVENTION

The present invention is concerned with eliminating difficulties encountered in conventional gearing, as will be explained more in detail later. The present invention deals particularly with gearing of a character in which inner and outer concentric gears are brought into mating relationship in a plurality of spaced areas, with interspersed areas in which they are not in mating relationship, and the areas of mating relationship are propagated forward in a wave which for the purposes of the present invention is described as a strain wave, since it represents a wave deflection in one of the gearing elements.

This strain wave is actually superimposed on the circumference of one or both of the gears, and travels with respect to it at a rate which is determined by the rate of application of load or rotatory force to the mechanism.

It should be appreciated that in the mechanism of the present invention, unlike all ordinary gearing, cooperating gears move into and out of tooth engagement by radial motion of the teeth of one gear with respect to the other, without in the least necessitating any change in the gear axis. It will be evident, therefore, that this action presupposes a motion of parts of one of the gears with respect to other parts which can be accomplished in any suitable manner, but preferably will be achieved by distorting an elastic material, which may be for example an elastomer such as rubber, synthetic rubber, nylon, or other plastic, or a metal such as steel, bronze, or other gear material, moving within the elastic limit, and thereby substantially free from plastic deformation.

While in the broadest aspects, the invention is applicable to rings which frictionally engage, as well as to elements having tooth engagement, and while it is also applicable to straight elements having tooth engagement which are distorted to mate and propagate a strain wave, like cooperating rack elements, it will be evident that the invention is believed to have its widest application in relatively internal and external gears, one of which is distorted at a plurality of points to mate with the other cooperating gear.

It will, however, be understood that the principles of the invention are applicable to any suitable mechanism which applies the propagated wave inducing mating engagements according to the disclosure of the invention.

PRINCIPLES OF OPERATION

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing." Such a wave is illustrated in Figure 9.

In the simplest form as shown for example in Figures 1 to 8 inclusive, the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 8 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the pitch line of the teeth at the major axis equal to the pitch diameter of the ring gear as shown at 76 in Figures 4 and 8. At the position as shown in Figure 8 the pitch circles of the two gears are coincident. At the minor axis the pitch line of the strain gear teeth is smaller than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

Figure 9 plots a curve for a strain gear having a two lobe strain inducer. There are therefore two complete waves in 360° or one complete revolution. The ordinate is tooth engagement in 0.001 inch and the abscissa is degrees in the revolution. The height of the wave is equal to the total deflection. This is referred to as tooth engagement because it is this up and down or actually radial in and out motion that produces tooth engagement and disengagement in circular strain wave gearing. Straight lines are superimposed on the two sides of the wave to obtain the closest possible match over as great a percentage of the distance as possible. When the height of the triangle formed in this manner is 1.44 times greater than the deflection, the match over more than 50% of the curve is within ± 0.00025 inch. This is explained in detail in reference to my prior Patent No. 2,926,143 above referred to.

The dots shown in Figure 9 on the strain wave are plotted from actual data measured from a strained ring. These dots also show the progressive movement of the teeth on a strain gear with movement of the strain inducer. This wave of course is purposely exaggerated in height to properly illustrate the wave shape and facilitate accurate plotting. If the degrees (revolution) were shown to the same scale as the deflection, the wave would be approximately 125 times as long as illustrated. This wave at any instant is superimposed on the circumference of a circle, and height of the total wave or the deflection is approximately twice the radial displacement of the peaks of the wave from this circle. If it were plotted in this manner, the deflection for that portion of the wave having a greater radial distance from the center than the circumference would be given as "plus" strain. The other portion of the wave having a lesser radial distance would be given as "minus" strain. The position before strain (or the circumference of the relaxed ring) is indicated in Figure 9 as the "undeflected position." However, it will be evident that measurement of the wave and all of the calculations are simplified by considering the total deflection as being measured from a base line coincident with that portion of the wave which has the least radial distance from the center.

It will be evident upon analysis that the shape of the wave drawn to a base line equal in length to the circular pitch, that is, the distance from one tooth to the next, will accurately outline the tooth form. When drawn to these proportions the wave looks essentially as shown in Figure 9, with the abscissa equal to the circular pitch for two teeth. In order to illustrate this relationship, the deflection wave shown in Figure 10a is represented as a linear function of revolution. The deflection is made exactly equal to the tooth height as shown in Figure 10b. Thus it will be seen that a 90° revolution of a two lobe strain inducer in strain wave gearing produced according to these proportions will cause a change in radial deflection equal to the tooth height for the teeth that were either fully engaged or fully disengaged.

For properly shaped teeth, 100% of the teeth under this condition would be in contact, but in various degrees of engagement. Proceeding from the base line in Figures 10a and 10b, or from the disengaged position, one side of the teeth on the strain gear will become progressively more engaged with one side of the teeth on the ring gear as the apex of the curve is approached. At the point of 45° revolution, the teeth will be engaged 50% or deflection/2. At 90° revolution they will be fully engaged. Proceeding beyond 90°, the teeth will become progressively less engaged on the next 90° revolution. Here, however, the opposite side of the tooth is in contact. It is an unusual feature of the gearing of the present invention that for the same direction of drive successively opposite sides of the same tooth engage as the teeth advance.

Hence for 90° revolution the phase relationship of the teeth changes 180° or it is one-half tooth out of phase. This accordingly indicates that the teeth, for this shape of strain wave, should be equal in height to the deflection and have a base line equal to the out-of-phase relationship for 180° revolution. The included angle is determined by this relationship. The sides of this angle are straight since the deflection chosen has a linear relationship with revolution. Consequently the curve of Figure 10a is fully representative of tooth form if the abscissa is equal to the circular pitch of one tooth.

From Figure 10 it is possible to produce a generalized formula for circular pitch for use in strain wave gearing calculation. The nomenclature as applied to this calculation and as appearing on Figure 10 is as follows:

$d$ = total deflection — difference in pitch diameters.
$D_R$ = pitch diameter of ring gear
$D_F$ = pitch diameter of strain gear
$p$ = circular pitch
$n$ = number of lobes on strain inducer
$N_R$ = number of teeth on ring gear
$N_F$ = number of teeth on strain gear
$d = D_R - D_E$ $$D_R = \frac{N_R P}{\pi}$$

$$D_E = \frac{N_E P}{\pi}$$

$n = N_R - N_E$

Then $$d = \frac{N_R P}{\pi} - \frac{N_E P}{\pi}$$

therefore the circular pitch formula for strain wave gearing is $$P = \frac{\pi d}{n}$$

Here the circular pitch is reduced to a definite relationship with deflection and number of lobes on the strain inducer. As a result, the tooth form is dependent only upon the number of lobes on the strain inducer. In producing Figure 10, it was assumed that the curve is a linear function of revolution. This, of course, is not strictly true for a natural strain wave.

DISTINCTIVE FEATURES

Th radically different principles upon which the operation of strain wave gearing depends produces parameters differing considerably from those normal for conventional gearing. These differences are outlined and discussed in the following paragraphs:

Large gear reduction

Due to the differential action between the two gears, large gear reductions are easily obtained without multiplicity of parts. One of the means of calculating gear ratio is the pitch diameter of the driven gear divided by the deflection. Since the deflection can be made very small, the gear ratios can be made very large without sacrificing the other advantages of strain wave gearing.

High efficiency for high gear ratio

The efficiency of strain wave gearing is discussed in my U.S. Patent No. 2,926,143 previously referred to. It was there shown that a gear system with a ratio of 100 to 1 had an over-all efficiency between 69 and 96 percent depending on workmanship and lubrication. Increasing the gear ratio does not decrease the efficiency as markedly as is the case in standard gearing. If the same easily attainable coefficients of friction and the same type strain inducer are used, a 400 to 1 ratio gear system will have an 80 percent efficiency in relation to 93 percent efficiency for a 100 to 1 ratio. By the use of a different type strain inducer, more suitable for the higher ratio, the efficiency of the 400 to 1 ratio system will be 88 percent. It has been experimentally ascertained that a 300 to 1 ratio strain wave gear system built into a motor had an efficiency in excess of 75 percent when tested under the adverse condition of light loading.

Small size

As indicated above in regard to the large torque capabilities, a strain wave gear reducer has a large capacity for given size. As a consequence, a unit for the same capacity would be relatively very small in size. Calculations indicate that, excluding the question of thermal capacity, a strain wave gear reducer would be less than 10 percent in cubic size of that of a standard gear reducer of equivalent ratio and torque capacity.

Ratios from 10 to 1 to 1,000,000 to 1

Deflection and diameter are the determinants of gear ratios—the smaller the deflection is relative to the diameter, the higher the gear ratio. Where gear ratios lower than approximately 75 to 1 are desired, it is necessary to use a material that has a lower modulus of elasticity than steel to obtain the necessary deflection. Since strain wave gearing has surface contact, low tooth contact pressures, low shear stresses in the teeth, and distributed stresses, nylon appears to be ideally suited for this purpose. For ratios from about 25 to 1 to 10 to 1 the proper grade of rubber or neoprene may be used to advantage.

Where it is desired to increase the ratio beyond approximately 200 to 1, a ball or roller strain inducer is used. The strain wave is generated by the individual balls or rollers which have a planetary reduction relationship to the sun inner raceway. In order to obtain the over-all ratio, the ratio of the strain wave gear is multiplied by the planetary reduction relation of the planet rollers with the sun inner raceway. Ratios up to 1000 to 1 can easily be obtained by this method without any increase in complexity.

For ratios from 1000 to 1 to 1,000,000 to 1, dual strain wave gearing is used. With this there are always gears instead of the usual two; a stationary ring gear, a movable driven ring gear and a strain gear. The two ring gears are keyed together by the deflected strain gear. The operation of dual strain wave gearing is described below.

Ratio selection not limited

Usually in differential mechanisms where teeth are used, ratios frequently are in steps and the ratios in between these steps can only be obtained by compounding. The ratios of toothed strain wave gearing, also, must of necessity be in steps. However, these steps are considerably smaller and are without voids. For example, the ratio can be stated simply as the number of teeth in the driven gear divided by the number of lobes on the strain inducer. Then for a three lobe strain inducer, ratios can be made to change in steps of one third. When the planetary strain inducer is used, this can be further divided to obtain any gear ratio desirable.

BASIC FORMS

The reader is referred to the patent above referred to for numerous examples of different types of strain inducers which can be employed in the present invention.

For some purposes it is desirable to obtain gear ratios which are substantially higher or substantially lower than those which can be conveniently secured from standard or inverted strain wave gearings of the single type. For such purposes dual or higher multiple strain wave gearing will be used. Illustrations of this are shown in Figures 11 and 12.

In Figure 11, there are two stages of strain wave gearing arranged in one housing. Ring gear 150 at one side is secured to housing 151 which is desirably stationary. The ring gear 150 meshes with external teeth 152' on one end of strain gear 152, under the action of strain inducer 153 which is turning with shaft 154 by which the input load is applied. The strain gear 152 at a longitudinally displaced position, has external teeth 155 which are acted on interiorly by the same strain inducer, and which exteriorly mesh with second internal ring gear 156 which has bearing support at 157 on the housing and is conveniently integral with the output shaft 158. The two sets of teeth on the strain gear are made with a maximum difference of a few teeth so that they do not differ greatly in pitch diameter. Consequently the difference in the deflection is so small that only one strain inducer is required and the two sets can be combined in a single ring without the need for substantial axial displacement between one set and another to allow for relative adjustment by flexibility of the intermediate tube.

It will be understood, however, that if the xaial displacement between the two sets of teeth on the strain gear is adequate, there can be wide disparity in the strain inducers, for example, one having two lobes and the other having three lobes.

This type of dual strain wave gearing is capable of producing enormous gear ratios without a multiplicity of parts. With a plain bearing strain inducer, ratios up to 200,000 to 1 can easily be obtained. With a planetary type strain inducer it is apparent that higher ratios are obtainable, up to enormous ratios of the order of 2,000,000 to 1. These enormous ratios are caused by the direction of rotation of one strain wave gear opposing or partially cancelling the rotation of the driven gear. For example, if the strain inducer 154 is rotated clockwise in Figure 11, the strain gear $S_F$ or 152 will rotate in the opposite direction or counterclockwise. At the same time, the other strain gear integral therewith $S_D$ or 155 is tending to drive the driven gear 156 the same direction as the strain inducer or clockwise. Consequently one adds and the other subtracts from the overall motion and by correctly determining the difference in the number of teeth, the very high gear ratios can be obtained.

This relation can best be shown by reducing each strain wave gear to its own specific gear ratio. Any suitable formula in Table 2 in said patent can be used for this purpose if we remember that the gear with the largest number of teeth turns in the same direction as the strain inducer. Since multiplication, addition, and subtraction enter into the calculations for dual strain wave gearing, it is mandatory that we use proper signs in designating directions. If the movement is in the same direction as the strain inducer, it is considered "plus." If the movement is opposite to that of the strain inducer, it is considered "minus." One simple method of always obtaining the proper ratio and sign is to divide the diameter of the gear being driven by the diameter of the gear being driven minus the diameter of the mating gear. When this is done the divisor will always be negative when the gear being driven has the smaller diameter, thus producing a negative or opposite direction gear ratio.

Applying this analysis to Figure 11, it will be evident that one revolution of the plain bearing strain inducer will cause the strain gear $S_F$ to rotate the reciprocal of the ratio $$R_F \text{ or } \frac{1}{R_F}$$

and since this rotation is in the opposite direction the result is $$\frac{1}{-R_F}$$

Since the strain inducer has rotated one turn to its original position and the strain gear $S_F$ has moved $$\frac{1}{-R_F}$$

the strain inducer has moved $$1+\frac{1}{R_F}$$

turns in relation to the strain gear $S_F$. One revolution of the strain inducer in relation to the strain gear $S_D$ (which is directly coupled and integral with $S_F$) would move the driven gear D the reciprocal of its gear ratio or $$\frac{1}{R_D}$$

Since this would move the same direction it is positive. Consequently, the motion of the driven gear D would become $$\left(1+\frac{1}{R_F}\right)\frac{1}{(R_D)}$$

for the relative motion which has taken place between the strain inducer and the strain gear $S_F$. As the two strain gears are coupled together, the motion of $$S_F \text{ or } \frac{1}{-R_F}$$

must be added to this.

$R_D$ = Ratio of driven side
$R_F$ = Ratio of fixed side

With 1 revolution of the strain inducer $$S_F \text{ rotates} -\frac{1}{R_F} \text{ revolutions}$$

and the strain inducer has rotated $1$ plus $\frac{1}{R_F}$ in relation to $S_F$ $$\therefore D \text{ rotates } \left(1+\frac{1}{R_F}\right)\times\frac{1}{R_D}+\frac{1}{-R_F}$$

The reciprocal of this $$= \text{Total Ratio} = \frac{\text{Input Turns}}{\text{Output Turns}} = R$$

$$R=\frac{-R_F R_D}{R_D - R_F - 1} \quad (1)$$

$$R=\frac{DS_F}{DS_F - FS_D} \quad (2)$$

The reciprocal of this, shown above in Formula 1, would be equal to the overall gear ratio. If the proper signs are considered, the formula can be stated simply "the product of the ratios divided by the sum of the ratios minus 1." This basic formula is shown below in Formula 3 and it is correct for all forms of dual strain wave gearing. Formula 2 applies specifically to dual strain wave gearing of the type of Figure 11, and was calculated by other means as a check on the above analysis.

Figure 12 illustrates a dual combined strain wave gear. Over at the right the construction substantially resembles that of Figure 11, except that the strain inducer extends inside only one side of the strain gear and the strain gear has external teeth which extend the full length and engage a correspondingly elongated ring gear 150'. At the opposite end from the strain inducer the strain gear has internal teeth 160 which mesh with an external driven gear 161 carried on the output shaft 158.

In effect, one side of the device is a standard strain wave gear form and the other side is an inverted form. The strain inducer produces deflection of the strain gear which causes the strain wave to act both in respect to the external teeth and the internal teeth in the manner above described. This arrangement is useful for very low gear ratios of the order of 30 to 1 when produced with steel, small diameter strain wave gears.

The following formulae were developed by analysis of the motions of these gears after the manner of that already described in respect to Figure 11:

$$R=\frac{-R_F(-R_D)}{-R_D - R_F - 1} \quad (3)$$

$$R=\frac{R_F R_D}{R_F + R_D - 1} \quad (4)$$

It will be evident that Formula 3 differs from Formula 1 only in respect to the sign of the ratio. If the proper signs are considered when calculating the individual ratios, basic Formula 4 may be used for gears of any of the dual strain-wave types.

It will likewise be evident that while strain inducers of a mechanical character have been illustrated, the strain wave can be applied by any means, whether electrical, magnetic, hydraulic, pneumatic, or vibratory which will generate and propagate a progressive strain wave.

In view of my invention and disclosure, variations and modifications to meet individual whim or particular need will doubtless become evident to others skilled in the art to obtain all or part of the benefits of my invention without copying the structure and method shown, and I, therefore, claim all such insofar as they fall within the reasonable spirit and scope of my claims.

Having thus described my invention, what I claim as new and desire to secure by Letters Patent is:

1. In a device for transmitting motion, a train of two sets of gearing each including a first gear having teeth, a strain gear having teeth of the same size as those on the first gear interconnecting the two sets, the strain gear being of different diameter from the first gear, concentric therewith and having a deflectable wall, a strain inducing element operative to deflect the strain gear and maintaining the strain gear deflected into mating relation with the first gear on the concentric axis at a plurality of circumferentially spaced positions interspaced by non-mating positions, and means for moving the operative relationship of the strain inducing element for each gearing set of the train relative to the periphery of the strain gear and thereby propagating a strain wave around the periphery of the strain gear and causing relative rotation of the strain gear with respect to the first gear.

2. A device of claim 1, in which the strain inducer is common to the two sets of gearing of the train.

3. A device of claim 1, in which the strain gear has two sets of teeth directed in the same radial direction.

4. A device of claim 1, in which the strain gear has two sets of teeth directed in opposite radial directions.

5. A device of claim 1, in which there are different numbers of teeth in the teeth sets on the strain gear operating in the different gearing sets.

6. A device of claim 1, in combination with a housing, one of the first gears being secured to the housing, another of the first gears constituting either the input or the output and the strain inducer constituting either the output or the input.

7. A device of claim 6, in which the strain gear has two sets of external teeth, and the strain inducer operates inside both sets.

8. A device of claim 6, in which the strain gear has one set of external teeth and one set of internal teeth, and the strain inducer operates inside the set of external teeth to one side of the set of internal teeth.

9. A device of claim 1, in which the mating gears have two diametrally opposed mating positions.

10. A device of claim 1, in which the mating gears have three generally equal circumferentially spaced mating positions.

11. A device of claim 1, in which in one of the gear sets the first gear is positioned inside the strain gear and the external surface of the first gear engages the strain gear.

12. A device of claim 1, in which in one of the gear sets the first gear surrounds the strain gear and the internal surface of the first gear engages the strain gear.

13. A device of claim 1, in which the strain inducing element comprises a raceway in contact with one circumferential surface of the first gear, and means including bearing elements travelling in the raceway for propagating a strain wave against the wall of the raceway.

14. A device of claim 1, in which the teeth of the first gear and the strain gear conform to the following formula:

$$\frac{\pi D}{p}$$

where $p$ equals circular pitch, $D$ equals fixed diameter.

15. A device of claim 1, in which the strain gear has a set of external gear teeth, and a set of internal gear teeth, the first gear has internal gear teeth, surrounds the strain gear, and cooperates with the external teeth on the strain gear and the strain inducer is positioned inside the strain gear, in combination with a further gear inside the strain gear having external gear teeth which make strain wave engagement on the strain gear.

16. A device of claim 1, in which the strain gear and the first gear have cooperating gear teeth of the same diametral pitch but of different pitch diameter and in which the number of teeth on the strain gear and the first gear differ by a quantity which is equal to or a multiple of the number of lobes on the strain inducer.

17. A gearing system including a plurality of interconnected sets of meshing gears and means for straining one of the gears of each set into engagement with another and thereby creating a strain wave, the gears having different numbers of teeth and the difference between the numbers of teeth on the respective gears equalling the number of strain waves per circumference.

18. In a device for transmitting motion, a first gear, a strain gear of different diameter from the first gear, concentric therewith and having a deflectable wall, the strain gear having two sets of axially displaced gear teeth on its outside, and the first gear being provided with internal teeth surrounding the strain gear and cooperating with one of the sets of teeth on the strain gear, a strain inducing element inside the strain gear, operative to deflect the strain gear and maintaining the strain gear deflected into mating relation with the first gear on the concentric axis at a plurality of circumferentially spaced positions interspaced by non-mating positions, a second gear surrounding the strain gear and in cooperative relation with the other of the sets of teeth on the strain gear, and means for moving the operative relationship of the strain inducing element relative to the periphery of the strain gear and thereby propagating a strain wave around the periphery of the strain gear and causing relative rotation of the second gear with respect to the first gear.

No references cited.